(12) United States Patent
Hostetter et al.

(10) Patent No.: US 11,719,345 B1
(45) Date of Patent: Aug. 8, 2023

(54) DOUBLE PORTED CONTROL VALVES FOR LOW FLOW RATE APPLICATIONS

(71) Applicant: FISHER CONTROLS INTERNATIONAL LLC, Marshalltown, IA (US)

(72) Inventors: David L. Hostetter, Colfax, IA (US); Benjamin J. Harris, Newton, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 17/579,438

(22) Filed: Jan. 19, 2022

(51) Int. Cl.
*F16K 1/44* (2006.01)
*F16K 1/54* (2006.01)

(52) U.S. Cl.
CPC . *F16K 1/44* (2013.01); *F16K 1/54* (2013.01)

(58) Field of Classification Search
CPC ..................................... F16K 1/44; F16K 1/54
See application file for complete search history.

(56) References Cited

U.S. PATENT DOCUMENTS

| | | | | |
|---|---|---|---|---|
| 3,435,850 A | * | 4/1969 | Male | F16K 1/44 137/625.34 |
| 3,821,968 A | * | 7/1974 | Barb | F16K 47/04 251/210 |
| 5,156,181 A | * | 10/1992 | Maalouf | F16K 1/44 137/315.27 |
| 6,928,995 B1 | * | 8/2005 | Hrytzak | F02M 26/69 123/568.2 |
| 9,354,638 B2 | * | 5/2016 | Rebreanu | F16K 1/12 |

* cited by examiner

*Primary Examiner* — Patrick C Williams
(74) *Attorney, Agent, or Firm* — Marshall, Gerstein & Borun LLP (57) ABSTRACT

An example method includes moving a first portion of a control element and a second portion of the control element coupled to the first portion from a closed position to an intermediate position. In the closed position, the first portion being seated against a first valve seat thereby preventing flow through a first orifice and the second portion being seated against a second valve seat thereby preventing flow through a second orifice. In the intermediate position, flow through the first orifice is deterred and flow through the second orifice is permitted. The method includes moving the first portion and the second portion from the intermediate position to an open position. In the open position, the first portion being spaced from the first valve seat thereby permitting flow through the first orifice and the second portion being spaced from the second valve seat thereby permitting flow through the second orifice.

18 Claims, 6 Drawing Sheets

DOUBLE PORTED CONTROL VALVES FOR LOW FLOW RATE APPLICATIONS

FIELD OF THE DISCLOSURE

The present patent relates generally to double ported control valves and, in particular, to double ported control valves for low flow rate applications.

BACKGROUND

Control valves are used to control fluid flow through a flow passage. Control valves having a larger control element and/or flow orifice may be used to control higher flow rates and control valves having a smaller control element and/or flow orifice may be used to control lower flow rates.

SUMMARY

In accordance with a first example, a control valve includes a valve body, a valve stem, and a control element. The valve body having an inlet, an outlet, a first valve seat, and a second valve seat. The valve body defining a first flow passage extending between the inlet and the outlet through the first valve seat, and a second flow passage extending between the inlet and the outlet through the second valve seat. The valve stem extending from the valve body and arranged for sliding movement relative to the valve body. The valve stem operatively coupled to a control element having a first portion and a second portion. The first portion of the control element slidably disposed in the first flow passage adjacent to the first valve seat. The second portion of the control element slidably disposed in the second flow passage adjacent to the second valve seat. The second portion of the control element slidable in response to movement of the first portion of the control element. The control element shiftable between a closed position, an intermediate position, and an open position. When the control element is in the closed position, the first portion of the control element is seated against the first valve seat and the second portion of the control element is seated against the second valve seat thereby preventing flow through both the first flow passage and the second flow passage. When the control element is in the intermediate position at least one of the first or second portions of the control element is disposed away from its corresponding valve seat to allow flow through its corresponding valve seat while an other of the first or second portions of the control element is disposed in a position to inhibit or prevent flow through its corresponding valve seat. When the control element is in the open position the first and second portions of the control element are both disposed away from their corresponding valve seats so as to allow flow through both the first flow passage and the second flow passage.

In accordance with a second example, a method includes moving a first portion of a control element and a second portion of the control element coupled to the first portion from a closed position to an intermediate position. In the closed position, the first portion being seated against a first valve seat thereby preventing flow through a first orifice and the second portion being seated against a second valve seat thereby preventing flow through a second orifice. In the intermediate position, flow through the first orifice is deterred and flow through the second orifice is permitted. The method includes moving the first portion and the second portion from the intermediate position to an open position. In the open position, the first portion being spaced from the first valve seat thereby permitting flow through the first orifice and the second portion being spaced from the second valve seat thereby permitting flow through the second orifice.

In further accordance with the foregoing first and/or second examples, an apparatus and/or method may further include any one or more of the following:

In accordance with one example, the first valve seat and the second valve seat are coaxial.

In accordance with another example, the second portion extends from the first portion.

In accordance with another example, the first portion and the second portion are unitary.

In accordance with another example, the first portion comprises a plug and the second portion comprises a tapered portion and a stem tip. In the closed position, the tapered portion seats against the second valve seat and the stem tip is positioned within an orifice.

In accordance with another example, the control valve includes a seal and a cage and a seal groove is defined between the first valve seat and the cage. The seal being received within the seal groove and positioned to seal against the first portion.

In accordance with another example, a lower surface of the first portion includes a tapered surface that engages and urges the seal outwardly and within the seal groove when the first portion moves from the open position to the intermediate position or to the closed position.

In accordance with another example, the control valve includes an insert including the second valve seat and having external threads that threadably engage threads of the valve body.

In accordance with another example, the control valve includes a seal that surrounds at least a portion of the insert.

In accordance with another example, the insert includes a head having one or more flat surfaces to enable the insert to be installed within the valve body using a tool.

In accordance with another example, the control valve includes valve trim including the insert.

In accordance with another example, the valve trim comprises a cylindrical body defining apertures to permit fluid to pass therethrough.

In accordance with another example, a bottom of the valve trim is closed.

In accordance with another example, the valve body includes an inward step and the insert has a corresponding step that engages the inward step of the valve body.

In accordance with another example, the second portion includes a stem, a plug, a pin, and a spring.

In accordance with another example, the stem includes a shoulder and a throughhole and the plug includes a throughhole. The spring being positioned between the shoulder of the stem and the plug and the pin extending through the throughholes to couple the plug and the stem together.

In accordance with another example, one of the throughholes of the stem or the plug has a circular cross section and the other of the throughholes of the stem or the plug has an oblong cross section to allow the plug to be movably coupled to the stem.

In accordance with another example, in the intermediate position, the method includes sealingly engaging the first portion with a seal positioned within a seal groove defined between the first valve seat and a cage to deter flow through the first orifice.

In accordance with another example, the method includes moving the first portion from the open position to the intermediate position or to the closed position and outwardly urging the seal with a tapered surface of the first portion.

DETAILED DESCRIPTION

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Figure 1:
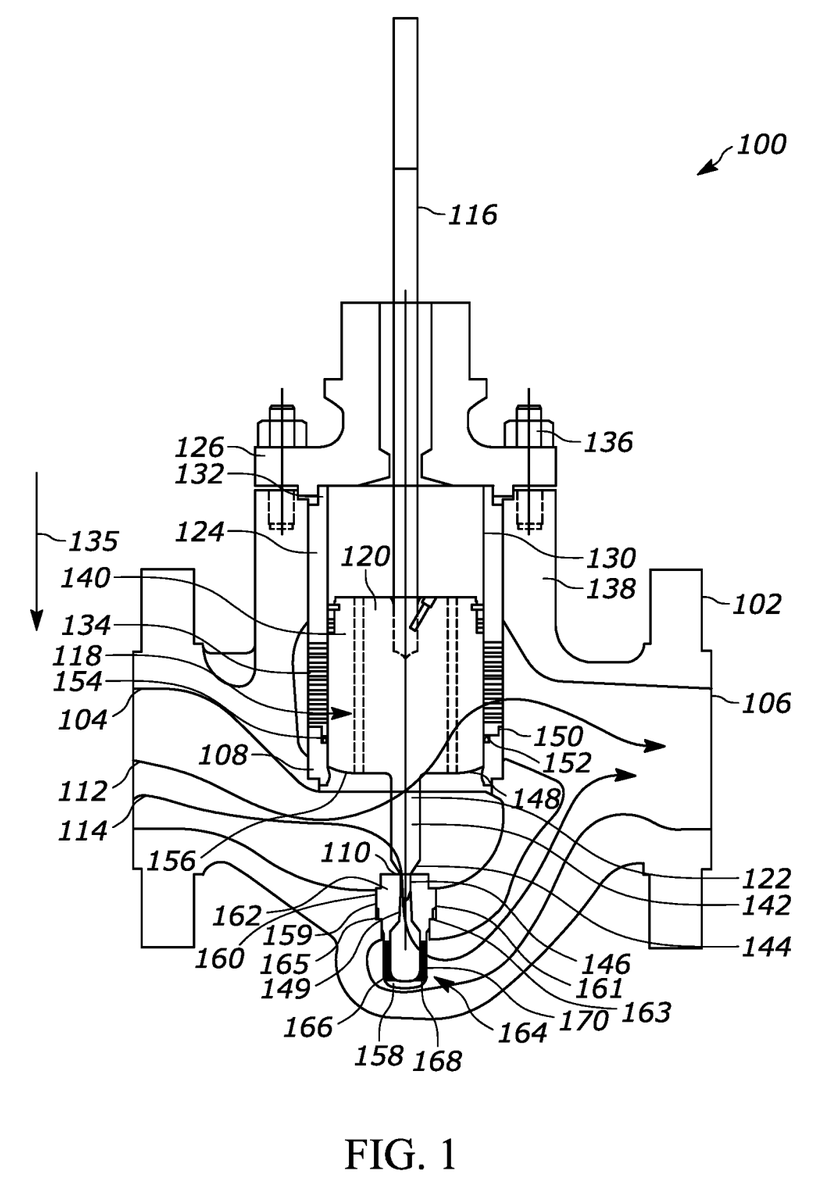
FIG. 1 illustrates an example of a double ported control valve assembled in accordance with a first disclosed example of the present invention.

Referring now to the drawings, FIG. 1 illustrates an example of a double ported control valve 100 assembled in accordance with a first disclosed example of the present invention. The control valve 100 includes a valve body 102 including an inlet 104, an outlet 106, a first valve seat 108, and a second valve seat 110. The first valve seat 108 and the second vale seat 110 are shown being coaxial.

The valve body 102 also has a first flow passage 112 extending between the inlet 104 and the outlet 106 through the first valve seat 108 and a second flow passage 114 extending between the inlet 104 and the outlet 106 through the second valve seat 110. A valve stem 116 of the control valve 100 is operatively coupled to a control element 118 having a first portion 120 and a second portion 122 and extending from the valve body 102 and arranged for sliding movement relative to the valve body 102. The first portion 120 of the control element 118 is slidably disposed in the first flow passage 112 adjacent to the first valve seat 108 and the second portion 122 of the control element 118 is slidably disposed in the second flow passage 114 adjacent to the second valve seat 110 and slidable in response to movement of the first portion 120 of the control element 118.

Figure 2:
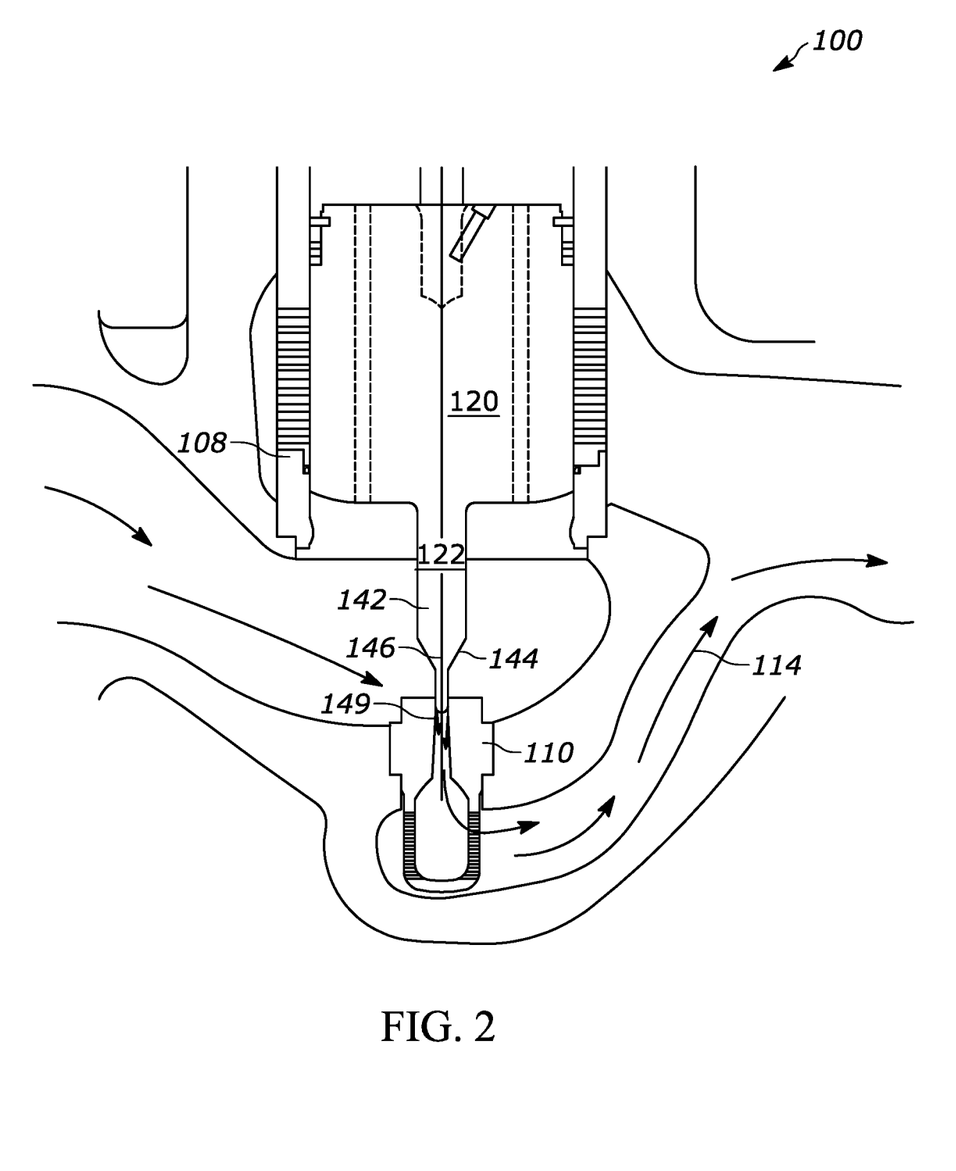
FIG. 2 illustrates the control valve of FIG. 1 in an intermediate position with fluid flowing through a second valve seat of the control valve but fluid not flowing through a first valve seat of the control valve.
Figure 3:
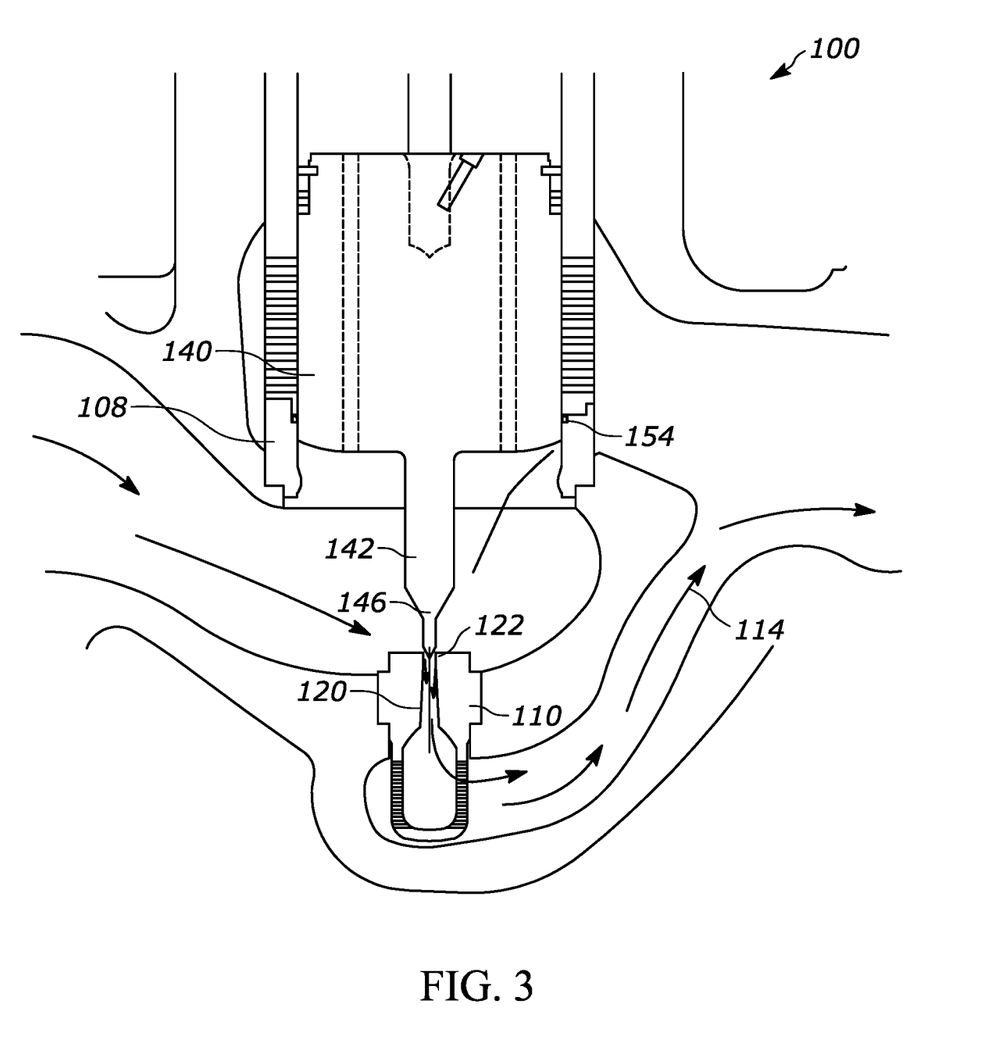
FIG. 3 illustrates the control valve of FIG. 1 in another intermediate position but with a second portion of a control element spaced from the second valve seat thereby allowing fluid to flow through the second valve seat of the control valve and with a first portion of the control element positioned to deter fluid flow through the first valve seat.
Figure 4:
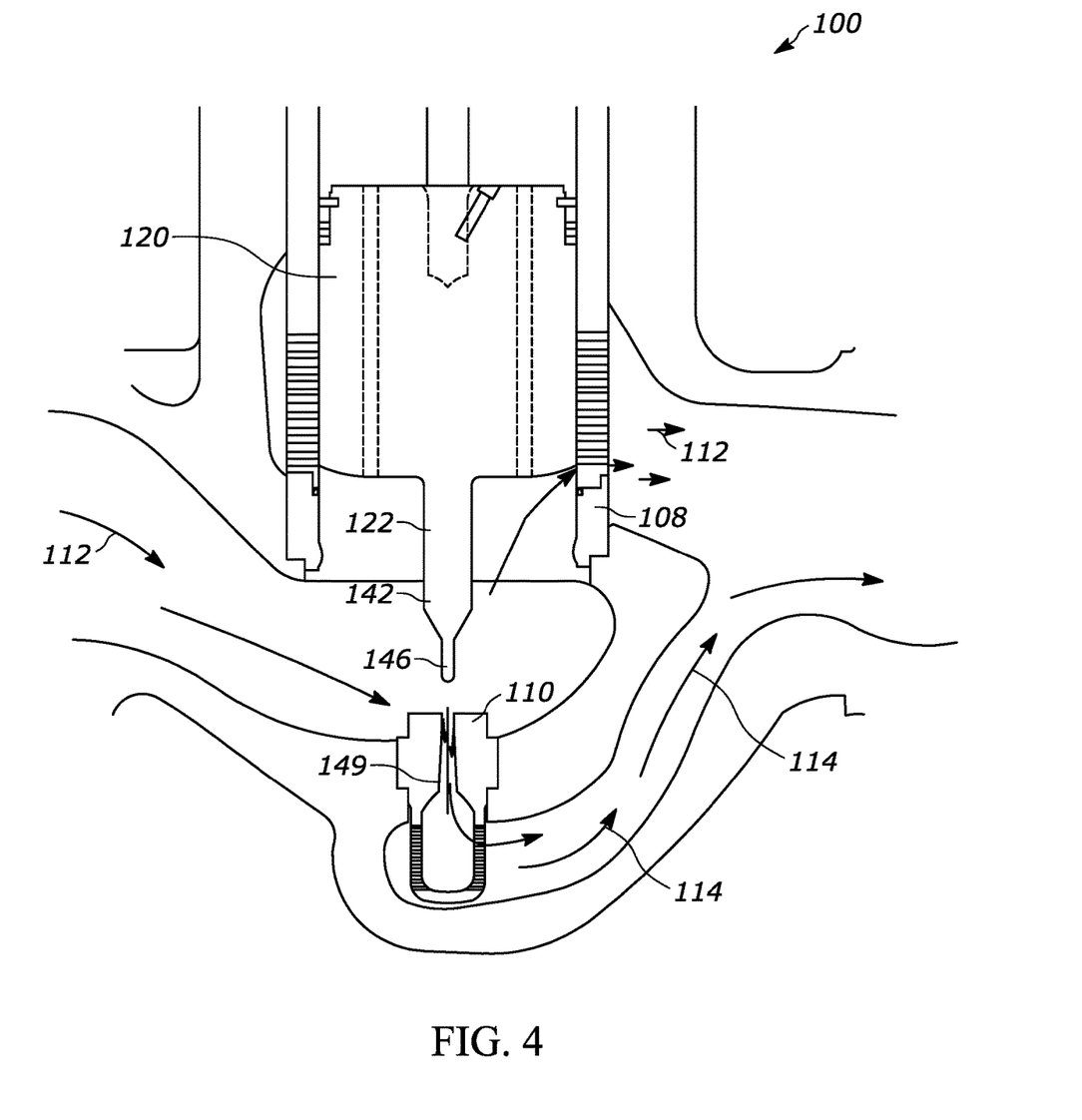
FIG. 4 illustrates the control valve of FIG. 1 in the open position with the second portion of the control element spaced from the second valve seat thereby allowing fluid flow through the second valve seat and the first portion of the control element spaced from the first valve seat thereby allowing fluid flow through the first valve seat.

The control element 118 is shiftable between a closed position shown in FIG. 1, an intermediate position shown in FIGS. 2 and 3, and an open position shown in FIG. 4. The first portion 120 of the control element 118 is seated against the first valve seat 108 and the second portion 122 of the control element 118 is seated against the second valve seat 110 when the control element 118 is in the closed position thereby preventing flow through both the first flow passage 112 and the second flow passage 114. When the control element 118 is in the intermediate position, the second portion 122 of the control element 118 is disposed away from the second valve seat 110 to allow flow through the second valve seat 110 while the first portion 120 of the control element 118 is disposed in a position to inhibit or prevent flow through the first valve seat 108. The first and second portions 120, 122 of the control element 118 are both disposed away from their corresponding valve seats 108, 110 when the control element 118 is in the open position so as to allow flow through both the first flow passage 112 and the second flow passage 114. The second portion 122 can be used to permit a lesser amount of fluid flow through the control valve 100 when the control element 118 is in the intermediate position and in the open position and the first portion 120 can be used to permit a greater amount of fluid flow through the control valve 100 when the control element 118 is in the open position.

The control valve 100 also includes a cage 124 and a bonnet 126. The cage 124 is disposed within the valve body 102 and has a central bore 130, an upper portion 132, and a lower portion 134. The lower portion 134 is seated against the first valve seat 108 and the upper portion 132 of the cage 124 is retained within the valve body 102 and/or urged in a direction generally indicated by arrow 135 by the bonnet 126. The bonnet 126 is coupled to the valve body 102 by fasteners 136. A height of the first valve seat 108 may be such to allow the first portion 120 to move upward (see, for example, FIG. 2) while still inhibiting or preventing fluid flow through the first valve seat 108 and a height of a neck 138 of the valve body 102 and/or a height of the cage 124 may be sized to accommodate for the height of the first valve seat 108 accordingly.

The first portion 120 is slidably received in the central bore 130 of the cage 124 and is coupled to the second portion 122. The first portion 120 and the first valve seat 108 have a larger diameter and are used to flow a larger amount of fluid through the control valve 100 and the second portion 122 and the second valve seat 110 have a smaller diameter and are used to flow a smaller amount of fluid through the control valve 100. The first portion 120 is thus used for higher flow rate applications and the second portion 122 is used for lower flow rate applications.

The first and second portions 120, 122 can be implemented in any configuration and are shown being unitary, the first portion 120 is a plug 140 and, specifically, a pressure balanced plug, and the second portion 122 extends from the first portion 120 into the both the first flow path 112 and the second flow path 114 in the example shown. The second portion 122 includes a stem 142, a tapered portion 144, and a stem tip 146, where the stem 142 extends from a lower surface 148 of the plug 140 and is positioned between the plug 140 and the tapered portion 144. The plug 140 seats against the first valve seat 108 in the closed position and as shown (FIG. 1), the tapered portion 144 seats against the second valve seat 110, and the stem tip 146 is positioned within an orifice 149 of the second valve seat 110. While the plug 141 is shown as a pressure balanced plug, the plug 141 may not be a pressure balanced plug.

Referring to an interface 150 between the cage 124 and the first valve seat 108, a seal groove 152 is defined between the first valve seat 108 and the cage 124 and a seal 154 is received within the seal groove 152. The seal 154 is positioned to seal against the first portion 120 when the control valve 100 is in the intermediate position to inhibit or prevent flow through the valve seat 108. The seal 154 may be any suitable seal commonly employed in the art. The seal 154 is preferably a C-seal that is arranged to be pressurized by the fluid to encourage the seal 154 to sealingly engage the first control element 128 and prevent or deter fluid flow through the first valve seat 108 when the control valve 100 is in the intermediate position.

The interface 150 between the cage 124 and the first valve seat 108 on the left side of the control valve 100 is shown as being a first stepped interface and the interface 150 between the cage 124 and the first valve seat 108 on the right side of the control valve 100 is shown as being a second stepped interface. Both the first side and the second side of the interface 150 may be the same in practice, however. The first stepped interface shown on the left side of the control valve 100 may allow the seal 154 to be more easily installed within the seal groove 152 as compared to the stepped interface shown on the right side of the control valve 100.

Still referring to the seal 154 and the first portion 120, the lower surface 148 of the first portion 120 has a tapered surface 156 that is arranged to engage and urge the seal 154 outwardly and within the seal groove 152 when the first portion 120 moves from the open position to the intermediate position or to the closed position in a direction generally indicated by arrow 135. The tapered surface 156 may be between approximately 7.5° and approximately 8.5°. Other angles may prove suitable, however.

Referring to the second valve seat 110, an insert 158 is provided that includes the second valve seat 110 and has external threads 159 that threadably engage threads 160 of the valve body 102. A seal 161 may surround at least a portion of the insert 158 and deters flow between the insert 158 and the valve body 102.

The insert 158 includes a head 162 and a step 163 and is part of valve trim 164 that extends into the second flow passage 114. The head 162 has one or more flat surfaces that form a hexagon to enable the insert 158 to be installed within the valve body 102 using a tool. While a hexagon is mentioned, the flat surfaces may form any other shape.

The step 163 of the insert 158 engages a corresponding inward facing step 165 of the valve body 102 and the valve trim 164 has a cylindrical body 166 and a bottom 168. The cylindrical body 166 defines apertures 170 that allow fluid to pass through the apertures 170 and the bottom 168 is closed and/or does not include apertures. Closing the bottom 168 may prevent the flow of fluid through the bottom 168 of the valve trim 164. The apertures 170 and/or the valve trim 164 may be arranged to reduce cavitation and/or to attenuate noise. While the insert 158 is shown including the valve trim 164, in other examples, such as, when the control valve 100 is arranged in a flow down arrangement, the valve trim 164 may be omitted (see, for example, FIG. 6).

FIGS. 2, 3 and 4 illustrate the control valve 100 of FIG. 1 in different positions. FIG. 2 illustrates the control valve 100 of FIG. 1 in the intermediate position with the fluid flowing through the second valve seat 110 of the control valve 100 but fluid not flowing through the first valve seat 108 of the control valve 100. As shown, the tapered portion 144 of the second portion 122 is spaced from the second valve seat 110 and the stem tip 146 is partially positioned within the orifice 149, thereby reducing some of the flow through the second valve seat 110.

FIG. 3 illustrates the control valve 100 of FIG. 1 in another intermediate position but with the second portion 122 spaced from the second valve seat 110 thereby allowing fluid to flow through the second valve seat 110 of the control valve 100 and with the first portion 120 positioned to prevent or inhibit fluid flow through the first valve seat 108. The stem tip 146 is spaced from the second valve seat 110 and the first portion 120 is positioned to allow the fluid to load the seal 154 in FIG. 3 such that the seal 154 is urged into engagement with the plug 140 and in contrast to the position of the portions 120, 122 in FIG. 2, thereby deterring flow through the first valve seat 108.

FIG. 4 illustrates the control valve 100 of FIG. 1 in the open position with the second portion 122 spaced from the second valve seat 110, thereby allowing fluid flow through the second valve seat 110 and the first portion 120 spaced from the first valve seat 108 thereby allowing fluid flow through the first valve seat 108.

Figure 5:
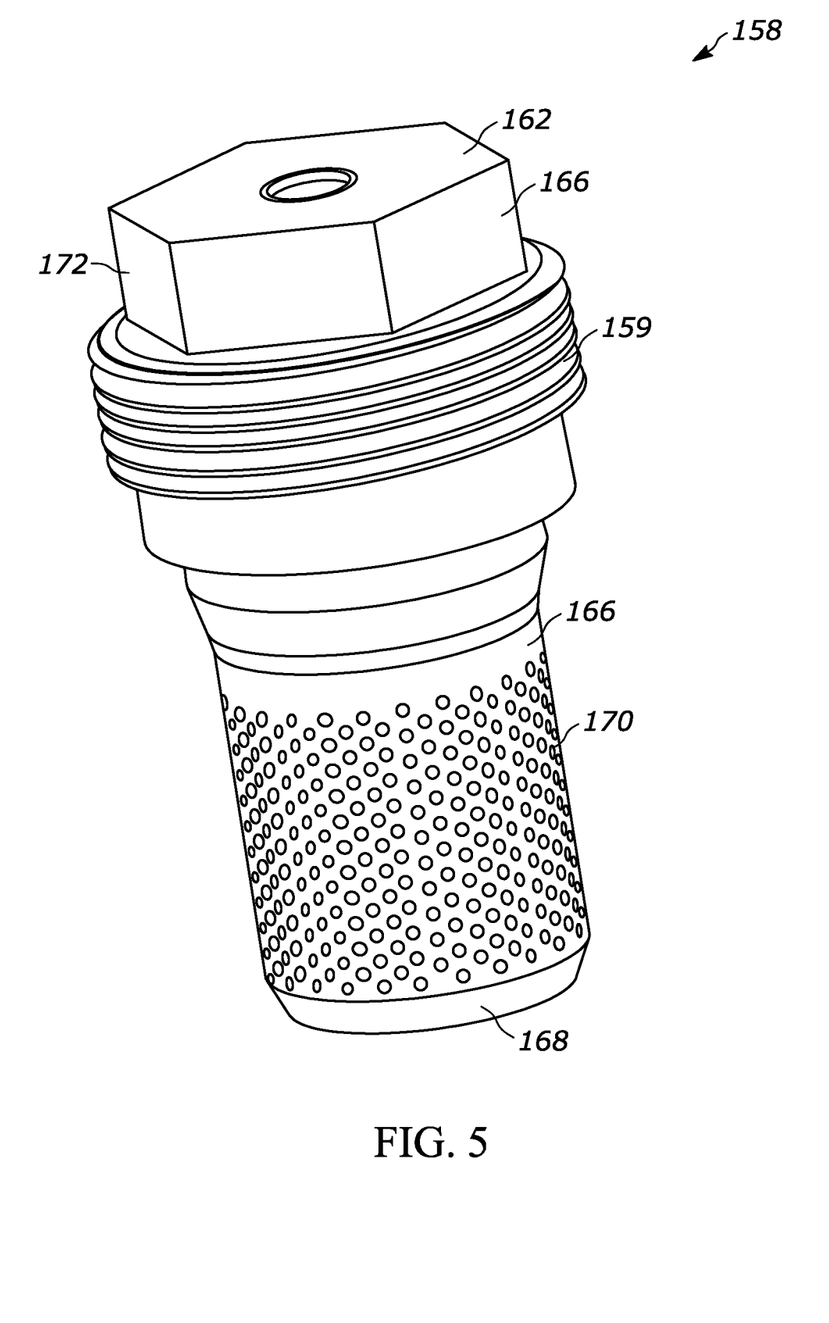
FIG. 5 is an isometric view of the insert of FIG. 1 that can be used with the control valve of FIG. 1.

FIG. 5 is an isometric view of the insert 158 of FIG. 1 that can be used with the control valve 100 of FIG. 1. The insert 158 includes the external threads 159, the head 162 has flat surfaces 172, the cylindrical body 166 defines the apertures 170, and the bottom 168. The apertures 170 are shown being arranged in a slightly staggered arrangement. The apertures 170 may be, however, positioned in any other arrangement.

Figure 6:
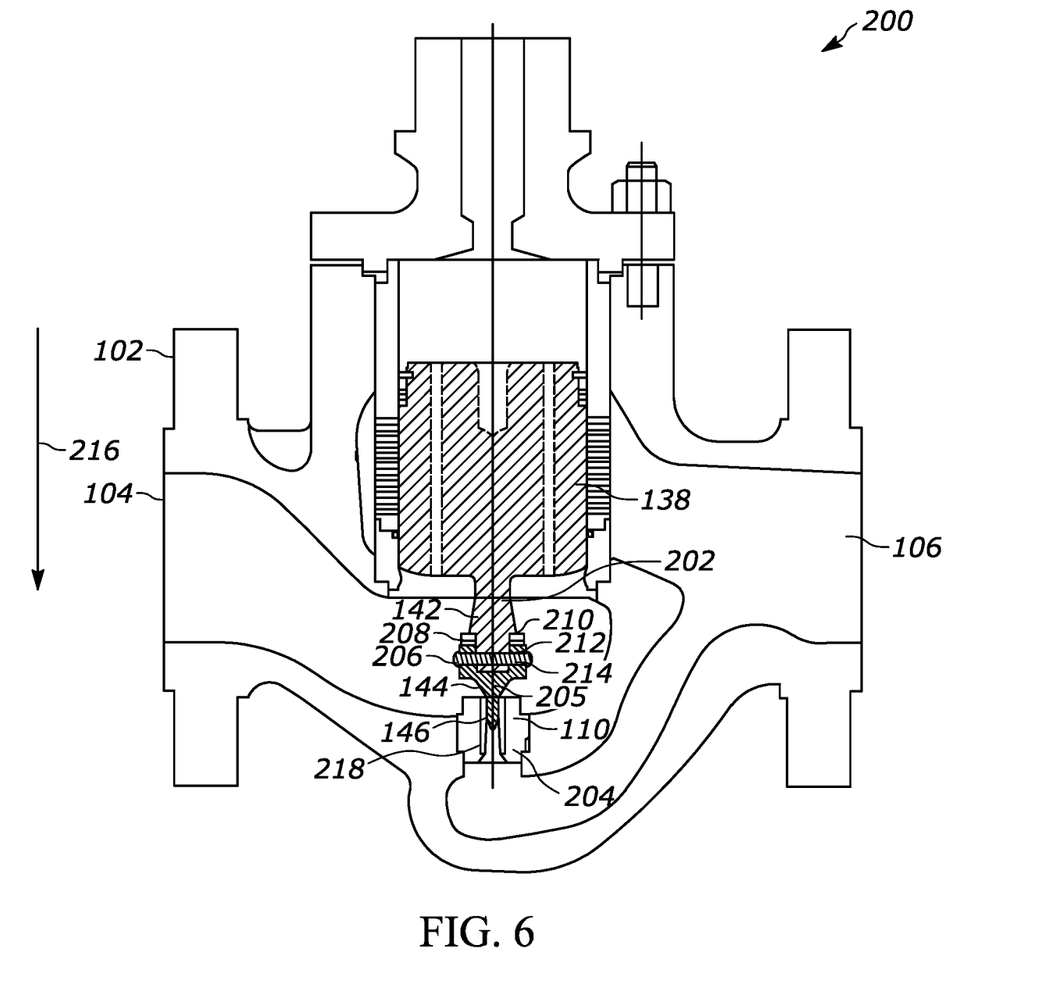
FIG. 6 illustrates an example of a double ported control valve assembled in accordance with a second disclosed example of the present invention.

FIG. 6 illustrates an example double ported control valve 200 assembled in accordance with a second disclosed example of the present invention. The control valve 200 of FIG. 6 is similar to the control valve 100 of FIG. 1. The control valve of FIG. 6, in contrast however, includes an alternative second portion 202 and an alternative insert 204. The second portion 202 includes the stem 142, a plug 205, a pin 206, and a biasing element 208 in the example shown. The stem 142 includes a shoulder 210 and a throughhole 212 and the plug 205 has a throughhole 214 that aligns with the throughhole 212 of the stem 142 to allow the pin 206 to extend through the throughholes 212, 214 and couple the plug 205 and the stem 142 together. The biasing element 208 is positioned between the shoulder 210 of the stem 142 and the plug 205 to urge the plug 205 in a direction generally indicated by arrow 216. The biasing element 208 is shown being a Belleville washer. Other types of biasing elements/springs may prove suitable, however.

The throughhole 214 of the plug 205 has an oblong cross section and the throughhole 212 of the stem 142 has a circular cross section in the example shown, thereby allowing the plug 205 to move relative to the stem 142. Allowing the plug 205 to move relative to the stem 142 compensates for manufacturing tolerances that may affect the ability of the first and second portions 120, 122 to engage the corresponding valve seats 108, 110 at the same time in the closed position. Either the stem 142 or the plug 205, however, may have throughholes having a circular and/or an oblong cross section and/or may be coupled in any suitable way to allow relative movement between the components.

Referring to the insert 204 of FIG. 6, the insert 204 is similar to the insert 157 of FIG. 1. The insert 204 of FIG. 6, in contrast however, does not include the lower portion of the valve trim 164 having the apertures 170 and has an orifice insert 218 that forms the second valve seat 110. The orifice insert 218 may be made of a harder material such as a carbide insert and may be retained within the insert 204 by an interference fit. Other materials may prove suitable, however, and the orifice insert 218 may be coupled to the insert 204 in different ways.

Further, while several examples have been disclosed herein, any features from any examples may be combined with or replaced by other features from other examples. Moreover, while several examples have been disclosed herein, changes may be made to the disclosed examples without departing from the scope of the claims.

What is claimed is:

1. A control valve, comprising:
a valve body having an inlet, an outlet, a first valve seat, and a second valve seat;
the valve body defining a first flow passage extending between the inlet and the outlet through the first valve seat, and a second flow passage extending between the inlet and the outlet through the second valve seat;
a valve stem extending from the valve body and arranged for sliding movement relative to the valve body, the valve stem operatively coupled to a control element having a first portion and a second portion;
the first portion of the control element slidably disposed in the first flow passage adjacent to the first valve seat;
the second portion of the control element slidably disposed in the second flow passage adjacent to the second valve seat, the second portion of the control element slidable in response to movement of the first portion of the control element;
the control element shiftable between a closed position, an intermediate position, and an open position;
wherein, when the control element is in the closed position, the first portion of the control element is seated against the first valve seat and the second portion of the control element is seated against the second valve seat thereby preventing flow through both the first flow passage and the second flow passage,
wherein, when the control element is in the intermediate position, at least one of the first or second portions of the control element is disposed away from its corresponding valve seat to allow flow through its corresponding valve seat while another of the first or second portions of the control element is disposed in a position to inhibit or prevent flow through its corresponding valve seat; and
wherein, when the control element is in the open position, the first and second portions of the control element are both disposed away from their corresponding valve seats so as to allow flow through both the first flow passage and the second flow passage; and
further comprising a seal and a cage, and wherein a seal groove is defined between the first valve seat and the cage, the seal being received within the seal groove and positioned to seal against the first portion.

2. The control valve of claim 1, wherein the first valve seat and the second valve seat are coaxial.

3. The control valve of claim 1, wherein the second portion extends from the first portion.

4. The control valve of claim 1, wherein the first portion and the second portion are unitary.

5. The control valve of claim 1, wherein the first portion comprises a plug and the second portion comprises a tapered portion and a stem tip, wherein in the closed position, the tapered portion seats against the second valve seat and the stem tip is positioned within an orifice.

6. The control valve of claim 1, wherein a lower surface of the first portion comprises a tapered surface that engages and urges the seal outwardly and within the seal groove when the first portion moves from the open position to the intermediate position or to the closed position.

7. The control valve of claim 1, further comprising an insert comprising the second valve seat and having external threads that threadably engage threads of the valve body.

8. The control valve of claim 7, further comprising a seal that surrounds at least a portion of the insert.

9. The control valve of claim 7, wherein the insert comprises a head having one or more flat surfaces to enable the insert to be installed within the valve body using a tool.

10. The control valve of claim 7, further comprising a valve trim including the insert.

11. The control valve of claim 10, wherein the valve trim comprises a cylindrical body defining apertures to permit fluid to pass therethrough.

12. The control valve of claim 7, wherein the valve body comprises an inward step and the insert has a corresponding step that engages the inward step of the valve body.

13. The control valve of claim 1, wherein the second portion comprises a stem, a plug, a pin, and a spring.

14. A control valve, comprising:
a valve body having an inlet, an outlet, a first valve seat, and a second valve seat;
the valve body defining a first flow passage extending between the inlet and the outlet through the first valve seat, and a second flow passage extending between the inlet and the outlet through the second valve seat;
a valve stem extending from the valve body and arranged for sliding movement relative to the valve body, the valve stem operatively coupled to a control element having a first portion and a second portion;
the first portion of the control element slidably disposed in the first flow passage adjacent to the first valve seat;
the second portion of the control element slidably disposed in the second flow passage adjacent to the second valve seat, the second portion of the control element slidable in response to movement of the first portion of the control element;
the control element shiftable between a closed position, an intermediate position, and an open position;
wherein, when the control element is in the closed position, the first portion of the control element is seated against the first valve seat and the second portion of the control element is seated against the second valve seat thereby preventing flow through both the first flow passage and the second flow passage,
wherein, when the control element is in the intermediate position, at least one of the first or second portions of the control element is disposed away from its corresponding valve seat to allow flow through its corresponding valve seat while another of the first or second portions of the control element is disposed in a position to inhibit or prevent flow through its corresponding valve seat; and
wherein, when the control element is in the open position, the first and second portions of the control element are both disposed away from their corresponding valve seats so as to allow flow through both the first flow passage and the second flow passage;
an insert comprising the second valve seat and having external threads that threadably engage threads of the valve body and including a valve trim including the insert, wherein the valve trim comprises a cylindrical body defining apertures to permit fluid to pass therethrough, and wherein a bottom of the valve trim is closed.

15. A control valve, comprising:
a valve body having an inlet, an outlet, a first valve seat, and a second valve seat;

the valve body defining a first flow passage extending between the inlet and the outlet through the first valve seat, and a second flow passage extending between the inlet and the outlet through the second valve seat;
a valve stem extending from the valve body and arranged for sliding movement relative to the valve body, the valve stem operatively coupled to a control element having a first portion and a second portion;
the first portion of the control element slidably disposed in the first flow passage adjacent to the first valve seat;
the second portion of the control element slidably disposed in the second flow passage adjacent to the second valve seat, the second portion of the control element slidable in response to movement of the first portion of the control element;
the control element shiftable between a closed position, an intermediate position, and an open position;
wherein, when the control element is in the closed position, the first portion of the control element is seated against the first valve seat and the second portion of the control element is seated against the second valve seat thereby preventing flow through both the first flow passage and the second flow passage,
wherein, when the control element is in the intermediate position, at least one of the first or second portions of the control element is disposed away from its corresponding valve seat to allow flow through its corresponding valve seat while another of the first or second portions of the control element is disposed in a position to inhibit or prevent flow through its corresponding valve seat; and
wherein, when the control element is in the open position, the first and second portions of the control element are both disposed away from their corresponding valve seats so as to allow flow through both the first flow passage and the second flow passage; and
wherein the second portion comprises a stem, a plug, a pin, and a spring; and
further wherein the stem comprises a shoulder and a throughhole and the plug comprises a throughhole, the spring being positioned between the shoulder of the stem and the plug and the pin extending through the throughholes to couple the plug and the stem together.

16. The control valve of claim 15, wherein one of the throughholes of the stem or the plug has a circular cross section and the other of the throughholes of the stem or the plug has an oblong cross section to allow the plug to be movably coupled to the stem.

17. A method, comprising:
moving a first portion of a control element and a second portion of the control element coupled to the first portion from a closed position to an intermediate position, in the closed position, the first portion being seated against a first valve seat thereby preventing flow through a first orifice and the second portion being seated against a second valve seat thereby preventing flow through a second orifice, in the intermediate position, flow through the first orifice is deterred and flow through the second orifice is permitted; and
moving the first portion and the second portion from the intermediate position to an open position, in the open position, the first portion being spaced from the first valve seat thereby permitting flow through the first orifice and the second portion being spaced from the second valve seat thereby permitting flow through the second orifice; and
wherein, in the intermediate position, further including sealingly engaging the first portion with a seal positioned within a seal groove defined between the first valve seat and a cage to deter flow through the first orifice.

18. The method of claim 17, further comprising moving the first portion from the open position to the intermediate position or to the closed position and outwardly urging the seal with a tapered surface of the first portion.

* * * * *

UNITED STATES PATENT AND TRADEMARK OFFICE
CERTIFICATE OF CORRECTION

PATENT NO. : 11,719,345 B1  
APPLICATION NO. : 17/579438  
DATED : August 8, 2023  
INVENTOR(S) : David L. Hostetter et al.

Page 1 of 1

It is certified that error appears in the above-identified patent and that said Letters Patent is hereby corrected as shown below:

In the Specification

At Column 3, Line 52, "vale" should be -- valve --.

At Column 4, Line 56, "the both" should be -- both --.

Signed and Sealed this
Twenty-second Day of October, 2024

Katherine Kelly Vidal
*Director of the United States Patent and Trademark Office*